United States Patent [19]
Savastano, Jr.

[11] Patent Number: 4,794,670
[45] Date of Patent: Jan. 3, 1989

[54] FISH CHUNK-CUTTING DEVICE

[76] Inventor: Thomas A. Savastano, Jr., 9 Dalley St., Whitehouse Station, N.J. 08889

[21] Appl. No.: 162,273

[22] Filed: Feb. 29, 1988

[51] Int. Cl.$^4$ ............................................. A22B 25/18
[52] U.S. Cl. .......................................... 17/61; 17/70; 83/607
[58] Field of Search .................. 17/68, 69, 70, 66, 61, 17/63; 30/114, 278; 83/527, 529, 530, 607, 608, 609

[56] References Cited

U.S. PATENT DOCUMENTS

| | | | |
|---|---|---|---|
| 95,561 | 10/1869 | Burgess | 83/607 X |
| 934,656 | 9/1909 | Brown | 99/537 |
| 1,044,966 | 11/1912 | Adams et al. | 83/607 |
| 2,185,985 | 1/1940 | Lund | 83/607 X |
| 2,655,259 | 10/1953 | Davoren | 83/607 |
| 2,822,845 | 2/1958 | Medlin | 83/574 |
| 3,590,423 | 7/1971 | Messer | 17/53 X |
| 3,675,273 | 7/1972 | Vidjak | 17/61 |

FOREIGN PATENT DOCUMENTS

182875 7/1906 Fed. Rep. of Germany ........ 83/607

*Primary Examiner*—Willie G. Abercrombie
*Attorney, Agent, or Firm*—William T. Hough

[57] ABSTRACT

In a preferred embodiment, a platform fish chunk-cutting combination having a platform substantially enclosed by circumscribing walls including an end upright wall at one end of a platform, mounting a pivotally-mounted lever carrying a blade having a bottom cutting-edge positioned and mounted to transverse space adjacent a gap defined between spaced-apart upright wall-portions of the end upright wall with the gap between the spaced-apart wall-portions being held to a minimum necessary for gap-insertion of a fish to be chopped into chunks, and including blade-limiting brackets that limit movement of the bottom cutting-edge to a minimum height necessary for gap-space insertion of the fish to be chopped into chunks and to a height not exceeding height of the gap-defining spaced-apart upright wall portions sufficiently to minimize potential accidental cutting of a person by the elongated cutting-edge, the blade being detachably-mounted and replaceable by another equivalent sharpened blade, the platform including detachable mounting structure including alternately useable (a) downwardly-extending cylindrical structure mountable on or within an open-space top of a support structure, at-least a major lower portion of the detachable mounting structure being conically shaped in a downwardly-extending direction such that the detachable mounting structure will stably support the platform in any of alternate vessels or supports having upper openings of different sizes and shapes, or (b) one or more serially mountable members having male and female ends mateable to form a support of optionally ranging from short to long length, on which the platform is mountable uprightly with the platform extending substantially horizontally, and of which a bottom end is mountable within or onto a rod-holder, and the combination further including a fish-grasping clamp having opposing jaws with opposing teeth thereof for clamping onto a fish to be held, with a biasing spring biasing the jaws together, and having spaced-apart opposing lever-handles compressible together to open the jaws allowing for the grasping of a fish therewith, the fish-grasping clamp including guard structure of a size and shape sufficiently obstructive as to prevent the fish-grasping clamp from being placed within said gap such that cutting of a person handling the fish-grasping clamp is minimized, the fish-grasping clamp being attached to the platform or walls thereof before, during and after use of the fish-grasping clamp.

25 Claims, 2 Drawing Sheets

FISH CHUNK-CUTTING DEVICE

BACKGROUND TO THE INVENTION

Prior to the present invention, there has not existed any cutting device suitable for efficient and safe use for cutting fish chunks or chum, on a fishing yacht or small fishing boat typically having rod holders carried by boat mounting structure and/or open top vessels such as boxes or barrel carried on the deck. Typically such bait fish are cut or chopped with a knife or chopping-blade held in the hand of the person, with the fish resting on a chopping-board, typically held by the free hand of the person. Such procedure result in variably-sized cuttings and involves inherent dangers of cutting or chopping the hand or fingers holding the fish being cut. Typically the cutting or chopping board is is devoid of suitable anchoring mechanism or devices to prevent it from slipping-about, particularly on a boat or yacht on tubulent seas, and particularly when both hands are occupied in the holding and cutting or chopping of a bait fish. For a pivoted blade, if the blade were not permanently mounted, it would be subject to slipping-off accidentally and possibly accidentally gouging the fish-holding hand or some nearby person, and as well, surrounding space in the vicinity of the entire length of the knife blade is exposed to accidental cutting of the free hand or fingers thereof—only a small portion of the knife's cutting-edge normally doing the cutting. When the knife becomes dulled, rarely is there a spare suitable knife available—and the cutting with a dulled cutting edge requiring greater force and increased difficulty in cutting or chopping the fish bait, resulting in increased presence of hazard of accidentally cutting the person together with reduced efficiency in the cutting or chopping of the bait fish.

PRIOR ART

U.S. Pat. No. 2,822,845 to Medlin, discloses a typical fish cutting knife and cutting-board, the particular knife disclosed having a notch therein for positioning on a tapered post mounted on the upper face of the cutting-board, allowing use of knife as a lever for slicing the fish by pressing downwardly on the knife-handle. This patent's combination is not intended for use on a boat or yacht for the cutting of bait or bait chuncks, and it inherently embodies the above-discussed problems and difficulties.

U.S. Pat. No. 3,675,273 to Vldjak, discloses a fish butchering apparatus inclusive of a power-operated vertically movable knife and horizontal table typically for use in a fish processing plant on a commercial scale. This patent, apart from disclosing a pivotally-mounted lever having a lower cutting-edgemounted on the top face of a large platform having supporting legs, is not relevant to the present invention in any regard to the problems confronted by applicant nor to the solutions afforded by the present invention.

U.S. Pat. No. 3,590,423 to Messer, discloses an open-top vessel 10 having a narrowed bottom to an open slot, with mounting hook-like brackets 40 for mounting over the edge of a boat such that scales and fish debris during fish cleaning will fall though the bottom open slot, but too small an opening to permit the falling-through of an accidentally dropped large fish, and discloses a cutting board with totally circumscribing walls, the inward wall being cut-down slightly, and the outer one having a sliding-door for opening in order to brush-away debris from the cutting surface of the cutting board. While there is no apparent disclosure relating to a cutting knife or the like, it is apparent that a conventional fish-cleaning sharp knife would here be employed, and the person would be confronted with all of the aforementioned problems.

U.S. Pat. No. 934,656 to Draughtsman is totally irrelevant and nonanalagous to the present invention, directed to a kafir corn header. It is here cited solely with regard to some of its lever-blade support structure for mounting opposing and upper blades. The lever-mounting structure has legs which fit into a vessel, whereby the lever is suspended above the floor of the vessel. None of the problems associated with corn would be analagous nor related to the prior practice of using a knife for the cutting of fish on a platform.

OBJECTS

Accordingly, the present invention is directed to the avoiding or overcoming of problems and difficulties of the nature discussed-above in the background statement.

More particularly, another object is to improve safety in the handling and cutting or chopping of fish typically into fish chunks.

Another object is to improve speed and efficiency of chopping or cutting fish into typically fish chunks.

Another object is to obtain a combination easily mountable on conventionally available support structure typically found on a yacht or small fishing boat, making possible easy securing of a cutting platform stably to avoid the shifting about of the cutting platform.

Another object is to provide alternate mounting support-structures and a platform adapted to alternately available mounting support-structures, such that there are a suitable number of options for securely mounting the cutting platform on a yacht or small fishing boat.

Another object is to obtain a cutting apparatus inclusive of a cutting board or platform, of which the problem of dulled blade may be readily avoided.

Another object is to obtain a cutting or chopping area deliberately limited to a minimal-sized height and width as to avoid unnecessary exposure to accidental cutting of the hand or fingers of the preson cutting or chopping the fish.

Another object is to provide an appropriate handling accessory avoiding hazards of a person cutting his hand or fingers during the cutting or chopping of the fish.

Another object is to provide detachable and portable support accessories for the platform, such that height of the platform may be optionally adjusted for standing and/or seated positions and to accomodate fishing rod mounts or other at varying heights, for mounting the present inventive combination at a desired height and-/or location.

Other objects become apparent from the following disclosure.

Objects of the invention are obtained by the invention described herein, as typically represented but not limited to the embodiments shown herein.

SUMMARY OF THE INVENTION

Broadly the invention includes a novel combination of a platform structure with an upper face and having one side-edge thereof as a linear side-edge, with an elongated lever carrying a lower elongated cutting-edge pivotally mounted at a proximal end for pivotal movement of a handle and distal end in cutting movement along the linear edge adjacent a gap-space formed between two spaced-apart end-portions of an upright wall mounted on the platform adjacent the linear edge; the size and height of the gap thereby formed is preferably and critically limited to minimal height and width dimensions essential for the insertion of a fish of a predetermined size. Additionally also there are critically and preferably lever-limiting structures preventing the lower elongated cutting-edge from being pivotal upwardly beyond a predetermined height-level and from being pivotal downwardly beyond a predetermined bottom-stroke-level at substantially a level of a lower face of the cutting-platform. As a result, the lower elongated cutting-edge is prevented from permitting excessive height of the gap or from exposing the cutting-edge of the blade above the gap or below the platform level, or beyond upper and lower height limits to an extent essential for the insertion through the gap-space and the cutting of a fish. This reduces unnecessary hazard to accidental exposure to the lower elongated cutting-edge, and reduces the potential for the cutting of a hand or fingers of the person by the lower elongated cutting-edge.

In a preferred embodiment, there is a detachably mounted blade carrying the lower elongated cutting-edge mounted on the elongated lever, replaceable by another equivalent blade having a sharpened or sharper lower elongated cutting-edge, as a replacement when the cutting-edge in use becomes dulled. As a result, by virtue of easy substitution of a sharpened cutting edge, prolonged use of a dulled cutting edge, together with greater difficulty in cutting and the increased propensity of a person to become careless while trying to manhandle the fish being cut by a dull blade, likelihood of cutting injury to the hand or fingers is substantially reduced.

In various other preferred embodiments, there are a variety of preferred improvements, relating to securely and/or stably mounting the platform prior to use thereof for the cutting of fish. In one preferred embodiment, there is provided any suitable mounting-support structure by which the platform is held uprightly with the platform being substantially horizontal, or with a desired tilt thereto. In a more particular and more preferred embodiment, that structure includes either a male member or a female member mounted about (around) a rod holder, normally and preferably being a male member mounted within a female rod holder. At the point of mounting the platform thereon, there is a conventional prior-art tilt mechanism and lock-handle allowing the unlocking, adjustment of the platform to desired tilt, and locking as adjusted. From the bottom or supporting portion of the tilt mechanism, there is preferably a downwardly-extending male member that may be mounted either in a female rod-holder, or in the upper end of the female portion of an elongated member. Instead of merely a single male and female member, there are preferably a plurality of such elongated members optionally mountable in series, with matings of male and female members, to the extent desired or necessary to obtain optimal height of the cutting-platform of this invention.

In an alternate embodiment of the mounting support structure, there is provided a cylindrically shaped structure, preferably detachably mountable on the bottom of the cutting-platform, for mounting in or on (around) the top of a bucket or barrel. In a further preferred embodiment, a major portion of the downwardly-extending mounting support structure is shaped as a downwardly pointed conical structure. The conical structure makes it possible for the conical structure to be mounted in a vessel having an upper opening of the same or smaller cross-section of any of variable shapes—whether round, square, triangular, or the like. Irrespective of the configuration of the opening, the conically shaped mounting structure will seat stably therein, providing a stable base for the cutting-platform. In a further embodiment, there is included a base-cylindrical vessel for storage of fish or tackle or the like, to have the multiple function of providing the base with open top into which the conically-shaped mounting structure is seatable.

In a further preferred embodiment there is a critically-present a grasping device of typical conventional prior art design, but a preferred critical part of this inventive combination as a feature making possible the safe grasping of a fish to be pushed into the gap-space, thereby avoiding the possibility of moving the hand or finger into the gap-space beneath the lower elongated cutting-edge, preferably being of a structure composed of opposing claws spring-biased together, with opposing handle pressable together to open the opposing jaw. The opposing jaw preferably include teeth opposingly mounted on the opposing jaws, for digging-into the upper and lower surfaces of the fish for a firmer grasp. In a ultimate preferred and critical embodiment, the grasping device includes guard structure of any desired shape and size provided its size and shape is sufficient as to prevent the forward portions of the grasping device from substantially entering the gap-space while advancing fish being cut, into the gap-space of the gap. This further reduces the possibility of a person accidentally moving a hand or fingers (holding the grasping device) to a position beneath the lower elongated cutting edge of the lever. In a still further embodiment, there is provided a chain or cord or other functional structure always anchoring the grasping device to the platform structure—before, during and subsequent to use of the grasping device. Thereby, the ever-present probability of eventually accidentally dropping it overboard, or misplacing it such that it is not readily avalible when ready to cut fish, is thereby avoided or precluded, thereby reducing the possibility of a person recklessly using his bare hand to insert fish into the gap-space beneath the elongated cutting-edge.

In another preferred embodiment, there are circumscribing upright walls substantially circumscribing the remaining edges of the platform, typically continuous with the upright wall wall forming the gap and gap-space thereof. The circumscribing upright walls, extending upwardly a minor height normally, serve to afford greater stability in the handling a slippery fish that otherwise might be more inclined to slip or fall-off the upper surface of the platform; reducing this possibility avoids the risk of a person when grabbing for or when trying to control the fish, of accidentally moving his had or fingers into dangerous proximity of the lower elongated cutting-edge.

The invention may be better understood by making reference to the following Figures.

THE FIGURES

DETAILED DESCRIPTION

Figure 1:
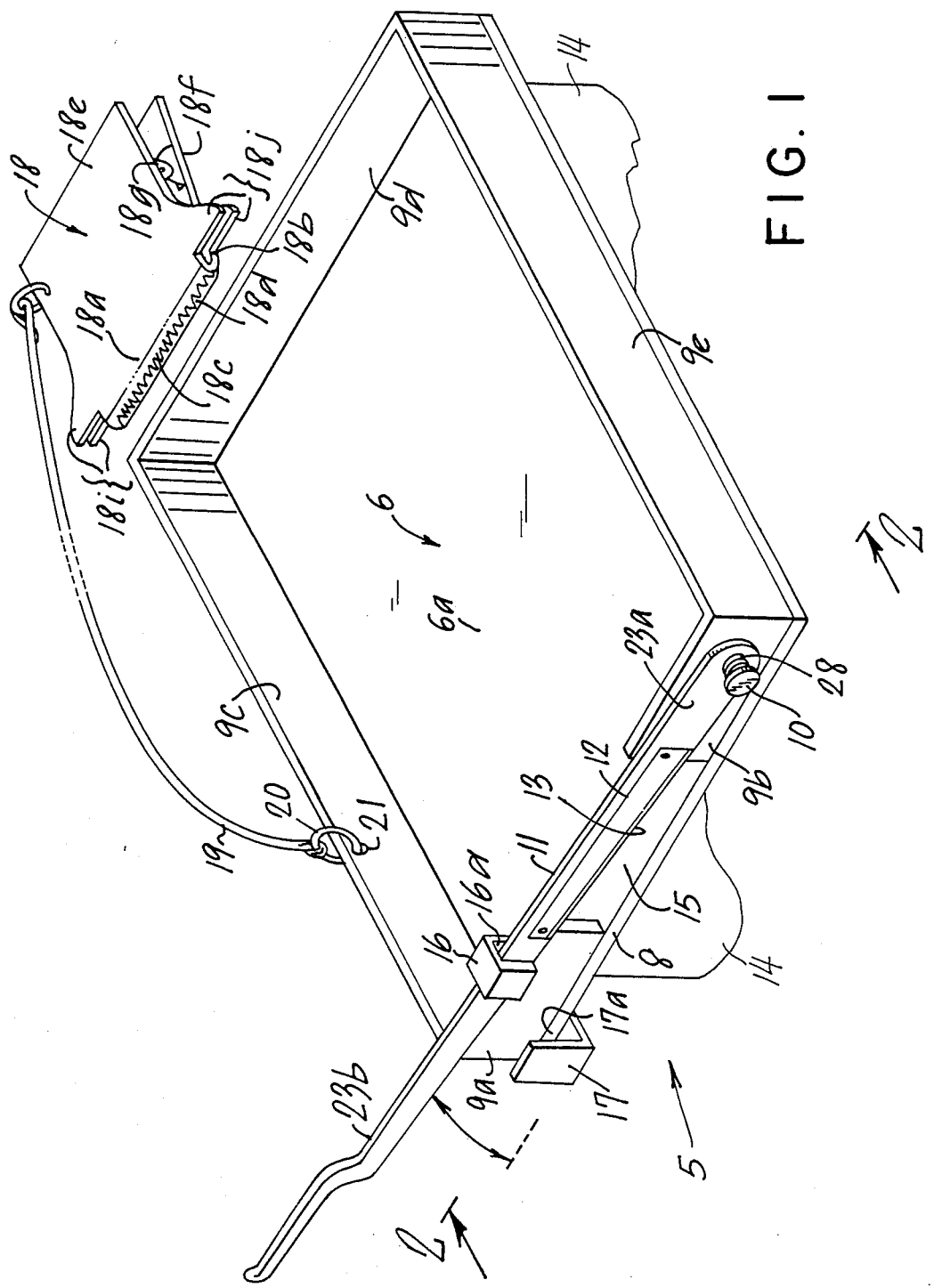
FIG. 1 illustrate a diagrammatic perspective in-part view of the fish-cutting combination in a preferred embodiment of the invention.
Figure 3:
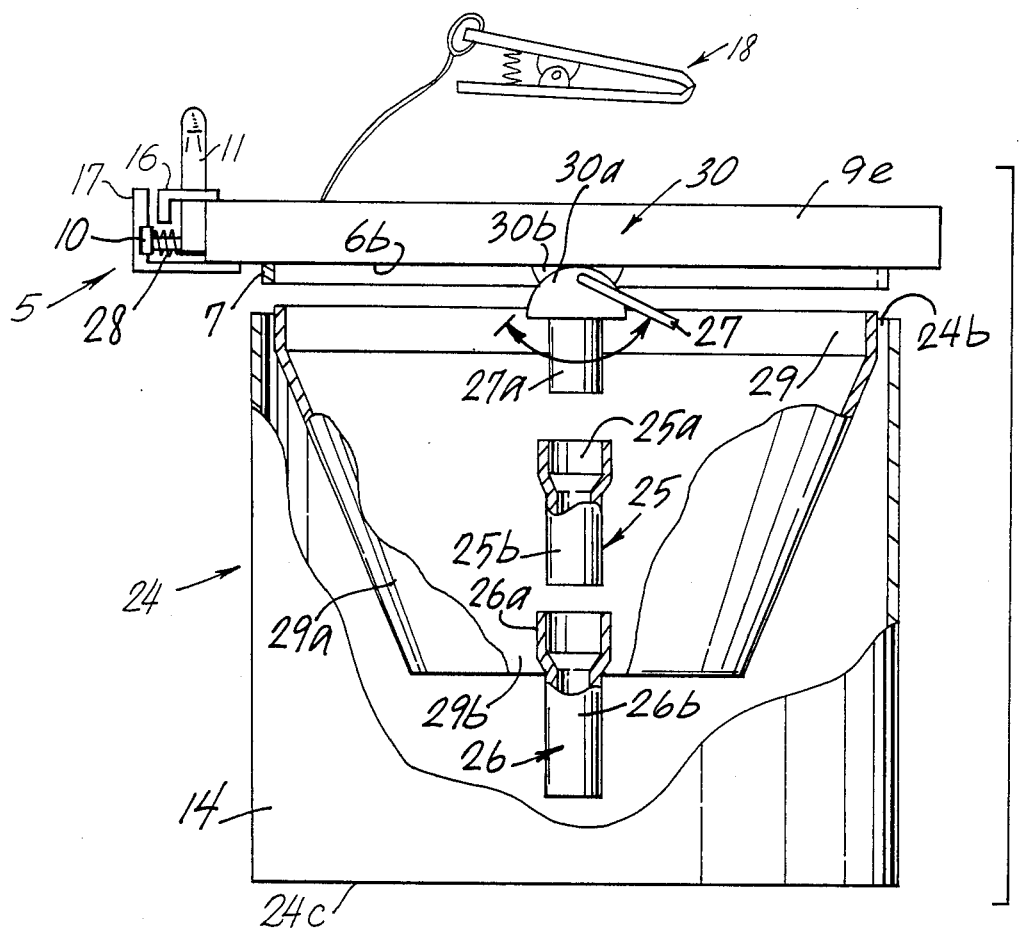
FIG. 3 illustrates diagrammatic side view, with partial cut-away, of an embodiment substantially the same as that of FIG. 1, illustrating alternate platform mounting support-structure.
Figure 4:
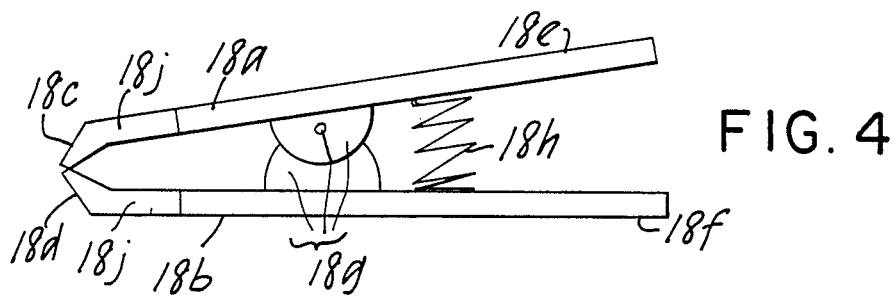
FIG. 4 illustrates diagrammatically a side view of the preferred grasping device of FIG. 1.
Figure 2:
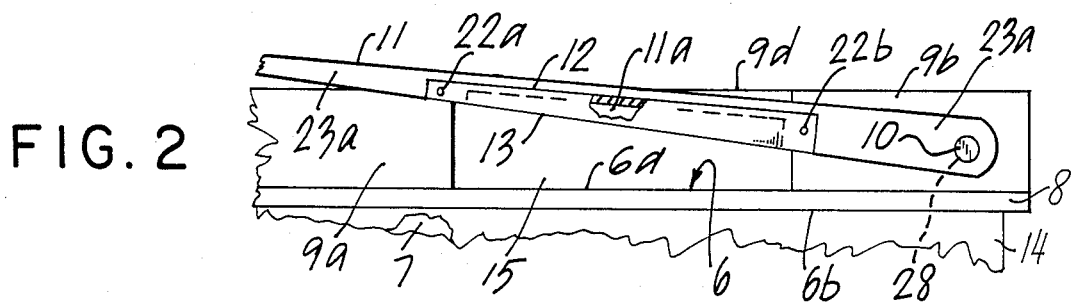
FIG. 2 illustrates a diagrammatic in-part view with partial cut-away, of the embodiment of FIG. 1, as taken along line 2—2 of FIG. 1.

The FIGS. 1 through 4 each and all illustrate preferred embodiments of this invention, corresponding features of FIGS. 2 through 4 being for the same illustrated embodiment of FIG. 1. Accordingly, corresponding indicia are utilized in all Figures, and once-described, are not redundantly redescribed for other Figures, except where done to amplify or expound in some regard, to improve understanding.

With regard to FIG. 1, there is shown the fish-cutting combination 5. Platform 6 has upper surface 6a and a lower surface 6b (shown in FIG. 2) and upright linear edge 8, extending below and adjacent gap 15 formed (defined) between spaced-apart wall portions 9a and 9b. The lever 11 has proximal end 23a thereof and distal end 23b thereof, with proximal end 23a mounted by headed-shaft 10 having spring 28 biasing against the lever to press it against the faces of the proximal and distal wall portions 9a and 9b and the upright linear edge 8, enhancing cutting capabilities of the lower elongated cutting-edge 13 of blade 12 that is mounted over lever cut-out 11a (shown in cut-away of FIG. 2) of lever 11. Mounted on and extending downward from the platform 6, is the cylindrical platform mounting structure 7. Located at the distal end 23b of lever 11, is a handle portion thereof. Stoke-limiting bracket 16 limits upward movement of the lever 11, preventing the lever from moving any further up than essential for insertion beneath the lower elongated blade 13, of fish to be cut. Bracket 17 is positioned and shaped to receive part of the distal lever end 23b, to terminate further downward movement of the lever 11 to a point below the platform bottom surface 6b (shown in FIG. 2). Bracket 16 forms the lever-receiving space 16a. Bracket 17 forms the lever-receiving space 17a.

Also shown in FIG. 1 is the grasping device 18. There are shown the opposing jaws 18a and 18b having opposing teeth 18c and 18d respectively, and opposing squeeze handles 18e and 18f, and connecting hinge structure 18g, and biasing spring 18h biasing jaws 18a and 18b toward one-another. The grasping device 18 is attached to a connecting cord 19 anchored by ring 20 to the platform's circumscribing wall 9c through hole 21. The gripper guard structure-protuberances 18i extend laterally from the front of each side of the jaws 18a and 18b. The jaws 18a and 18b, taken together with the extend of lateral lengths of the several guard structure-protuberances 18i and 18j, extending laterally sufficiently to result in a total width dimension substantially greater than a width dimension of the gap 15, thereby preventing the insertion of the jaws through the gap (gap-space) 15, thereby preventing the accidental insertion of a person's hand or fingers to a position beneath the lower elongated cutting edge 13.

Other circumscribing walls include walls 9d and 9e, with wall 9c joining with upright wall portion 9a and with wall 9e joining with upright wall portion 9b.

All features of FIG. 2 disclosure have been already described above.

FIG. 3 in side view illustrates substantially the entire structure of FIG. 1, additionally illustrating the support receptacle-vessel or bucket 14 having top opening 24b into which the cylindrically-shaped platform support structure 7 is seated (mounted). A cylindrically-shaped platform support structure 29, at a lower end thereof, is seated as a male member into a cylindrical bucket-like structure 24 having bucket wall 14 and bucket-bottom 24c and upper bucket-opening space 29b. Downwardly-extending conical structure 29a has an upper cylindrical edge that as a male-member typically frictionally mounts against inner walls of cylindrical wall 7 within the inner space formed thereby, and the conical structure 29a extends further downwardly as downwardly-extending conical structure having a through-space hole 29b provided at the cone's lower apex, providing space for the optional alternate-mounting elongated member 26. A bottom face 6b of the platform structure has mounted thereon (affixed thereto) a pivotal tilt mechanism 30 with tilt locking and unlocking handle 27 and mating pivot members 301 and 30b, and with a male member 27a extending downwardly from and a part of the pivot member 30a of the tilt mechanism 30, lockable to part 30b by turning of the handle 27. Mounted on and extending downwardly from the part 30b is a male member 27a that is seatable within either a fishing-rod holder, or within the upper female member 26a of elongated member 26; male member 26b of elongated member 26 is mountable within a fishing-rod holder, or optionally within female member 25a of elongated member 25 having male member 25b. The male member 26b that is mountable within a fishing rod holder (i.e. a female member) that is mounted on a boat or yacht. The securing mechanism between male and female members may be friction fits or alternately may have meshing male and female threads, or insertable keys locking them in place, or other optional or desired mechanisms of securing attachments thereof.

FIG. 4 illustrates more fully the hinge structures 18g and the spring 18h and the opposing teeth 18c and 18d of the jaws 18a and 18b.

Optionally, a steel or other metal plate or cutting edge may be mounted on the linear edge 8, in accord with desired or conventional or prior art designs and mechanism, as obvious modifications within the scope of the invention.

Likewise, it is optional where the proximal end of the lever is to be mounted. While shown mounted on the wall portion 9b, it may optionally be mounted on the face of the linear edge 8 at a location below the illustrated position of mounting. Likewise, to particular structure on which the brackets 16 and 17 are mounted respectively is not critical, so long as they are appropriately mounted on and supported by some equivalent base structure of the combination. It is also with the scope of this invention, for the lever-stroke limiting brackets to be adjustably mounted for alternate upward and/or downward adjustment in order to increase or reduce the length of the stroke, in order to thereby make adjustments for smaller or larger fish to be inserted into the gap-space for the cutting thereof.

Accordingly, it is within the scope of the invention to make variations and modifications and substitution of equivalents within ordinary skill of the art.

I claim:

1. A fish-cutting device for cutting-off chunks of fish for use as chum or fish bait, comprising in combination: a platform structure having an upper face and having one end formed with a linear side-edge of the platform structure; at-least one upright wall structure forming first and second opposite end-portions and forming a gap defined between said first and second opposite end-portions, mounted at said one end, said gap being upwardly open to free-space; a lever means including a lever having proximal and distal ends thereof and having an elongated lower lever-edge, said upright wall structure having a substantially flat side-surface extending substantially uprightly relative to said upper face of the platform structure; said lever means further including an elongated blade having a lower elongated cutting-edge, positioned for the cutting-edge to face downwardly from said elongated lower lever-edge; the proximal end of said lever being mounted on at-least one of said platform structure and said first end-portion, positioned for movement of said distal end and said lower elongated cutting-edge along said flat side-surface and parallel to and in close proximity to said linear side-edge and transverse to and in close proximity to said gap such that during downward movement of the lever, said lower elongated cutting-edge transverses space adjacent said gap whereby an item resting on said platform and extending beyond said gap, will be severed, at said linear side-edge; said lever having a predetermined length between said proximal and distal ends sufficiently large to accommodate positioning of a bait item to be cut, under said lower elongated cutting-edge extending through said gap; and said gap having a predetermined limited length-dimension along said linear side-edge between said first and second opposite end-portions, sufficiently less than said lever predetermined length, to a minimal length required for insertion of a bait item to be cut such that limited length of the gap serves to limit exposure of space susceptible to an item being severed by said lower elongated cutting-edge when said lever is moved pivotably downwardly whereby possibilities of accidental cutting of a person by said lower elongated cutting-edge is minimized.

2. A fish-cutting device of claim 1, in which said blade is detachably mounted onto said lever at a position intermediate between said proximal and distal ends.

3. A fish-cutting device of claim 2, including platform-mounting structure mounted on said platform structure, for mounting said platform structure uprightly within a fishing-rod holder.

4. A fish-cutting device of claim 3, in which said platform structure has a platform bottom face and in which said upright wall has an upper edge, and including blade-limiting means limiting range of upward and downward pivotal movement of said distal end within a predetermined range such that at said gap, said lower elongated cutting-edge is limited to movement up to said upper edge of said upright wall structure and downwardly substantially to said platform bottom face whereby possibilities of accidental cutting of a person by said lower elongated cutting-edge is minimized, said blade-limiting means limiting range of upward movement above said platform structure to a predetermined gap up to a portion of a height of first and second opposite end portions up to a minimum height sufficient for insertion through said gap a bait item to be cut whereby possibilities of accidental cutting of a person by said lower elongated cutting-edge within said minimum height is minimized.

5. A fish-cutting device of claim 4, including portable fish-grasping means for grasping and holding a fish to be positioned within said gap and below said lower elongated cutting-edge, and including handle structure for manually handling the fish-grasping means before, during and subsequent to grasping a fish.

6. A fish-cutting device of claim 5, including a connecting means for connecting said grasping means to said platform structure before, during and after use of the grasping means.

7. A fish-cutting device of claim 1, in which said platform structure has a platform bottom face and in which said upright wall has an upper edge, and including blade-limiting means limiting range of upward and downward pivotal movement of said distal end within a predetermined range such that at said gap, said lower elongated cutting-edge is limited to movement up to about said upper edge of said upright wall structure and dowardly substantially to said platform bottom face whereby random exposure to said lower elongated cutting-edge is minimized such that possibilities of accidental cutting of a person by said lower elongated cutting-edge is minimized.

8. A fish-cutting device of claim 7, including platform-mounting structure mounted on said platform means, for mounting said platform structure uprightly within a fishing-rod holder.

9. A fish-cutting device of claim 7, including portable fish-grasping means for grasping and holding a fish to be positioned within said gap and below said lower elongated cutting-edge, and including handle structure for manually handling the fish-grasping means before, during and subsequent to grasping a fish.

10. A fish-cutting device of claim 9, including a connecting means for connecting said grasping means to said platform structure before, during and after use of the grasping means.

11. A fish-cutting device of claim 10, including platform-mounting means mounted on said platform structure, for mounting said platform structure uprightly on top of an auxilliary support structure being a circular top in a substantially horizontal plane.

12. A fish-cutting device of claim 11, including said auxilliary support structure is a cylindrically-shaped vessel having said circular top, one of said platform-mounting means and said circular top being a male member, and a remaining one of said platform-mounting means and said circular top being a female member, said male and female members being mateable such that said platform structure is supportable uprightly.

13. A fish-cutting device of claim 12, in which said platform-mounting means includes a downwardly-extending conical portion adapted to fit stably within open-top structures of any of variable shapes of top-openings.

14. A fish-cutting device of claim 7, including platform-mounting means for mounting said platform structure uprightly on a circular top of an auxilliary support structure circular in a substantially horizontal plane.

15. A fish-cutting device of claim 14, including said auxilliary support structure as a cylindrically-shaped vessel having a top thereof with said circular shape, one of said platform-mounting means and said circular top being a male member, and a remaining one of said platform-mounting means and said circular top being a female member, said male and female members being mateable such that said platform structure is supportable uprightly.

16. A fish-cutting device of claim 15, in which said platform-mounting means includes a downwardly-extending conical portion adapted to fit stably within space of open-top structures of any of variable shapes of top-openings.

17. A fish-cutting device of claim 14, in which said platform-mounting means is detachably mountable on said platform structure.

18. A fish-cutting device of claim 7, including platform-mounting means for mounting said platform structure uprightly within a fishing-rod holder.

19. A fish-cutting device of claim 1, including platform-mounting means for mounting said platform structure uprightly within a fishing-rod holder.

20. A fish-cutting device of claim 1, including platform mounting means for mounting said platform structure uprightly on an auxilliary support structure, in which said platform-mounting means includes a plurality of serially detachably-mountable male and female structures adapted to be mounted within a fishing-rod holder such that said platform structure is supportable uprightly.

21. A fish-cutting device of claim 1, including portable fish-grasping means for grasping and holding a fish to be positioned within said gap and below said lower elongated cutting-edge, and including handle structure for manually handling the fish-grasping means before, during and subsequent to grasping a fish.

22. A fish-cutting device of claim 21, including guard structure extending laterally such that the fish-grasping means is prevented from entering within said gap such that possibilities of accidental cutting of a person by said lower elongated cutting-edge is minimized.

23. A fish-cutting device of claim 22, in which said fish-grasping means includes opposing gripping structures each carrying teeth and including a spring positioned to biase opposing teeth toward one-another, and includes opposing handle levers pressible together to open opposing teeth from one another such that the fish-grasping means may be positioned to grasp a fish.

24. A fish-cutting device of claim 1, including platform-mounting means mounted on said platform structure, for mounting said platform structure uprightly on an auxilliary support structure circular in a substantially horizontal plane.

25. A fish-cutting device of claim 1, including circumscribing wall structure substantially mounted on edges of and circumscribing and extending upwardly from said platform structure, extending substantially from said proximate end-portion to said distal-end portion.

* * * * *